J. H. GRAVELL.
ELECTRIC WELDING APPARATUS.
APPLICATION FILED SEPT. 7, 1918.

1,300,603.

Patented Apr. 15, 1919.

INVENTOR
James H. Gravell

BY
Townsend & Decker
ATTORNEY

UNITED STATES PATENT OFFICE.

JAMES H. GRAVELL, OF BROOKLYN, NEW YORK, ASSIGNOR TO THOMSON ELECTRIC WELDING COMPANY, OF LYNN, MASSACHUSETTS, A CORPORATION OF MASSACHUSETTS.

ELECTRIC WELDING APPARATUS.

1,300,603. Specification of Letters Patent. Patented Apr. 15, 1919.

Application filed September 7, 1918. Serial No. 253,013.

*To all whom it may concern:*

Be it known that I, JAMES H. GRAVELL, a citizen of the United States, and a resident of Brooklyn, in the county of Kings and State of New York, have invented certain new and useful Improvements in Electric Welding Apparatus, of which the following is a specification.

This invention relates to electric welding apparatus, the object being to provide a uniform current carrying contact for the work.

Although the invention is not limited thereto, it is especially useful in continuous lap seam welding where the welding is done by means of a roller.

It is well known in seam welding especially when the work is overlapped and heated directly beneath the welding roller that the periphery of the roller "pits" and becomes roughened due to particles of metal and dirt adhering thereto, causing imperfections in the welded seam. This makes the operation an expensive one owing to the necessity of removing the roller from the machine and again truing its periphery in a lathe.

According to this invention in its broadest form the roller is provided with a work-contacting strip which is readily replaceable in case of damage or mutilation. If desired means may also be provided to remove any particles or re-dress any roughness on the strip during its use in the machine.

The invention consists in the improved apparatus for electric welding hereinafter more particularly described and then specified in the claims.

Figure 1:
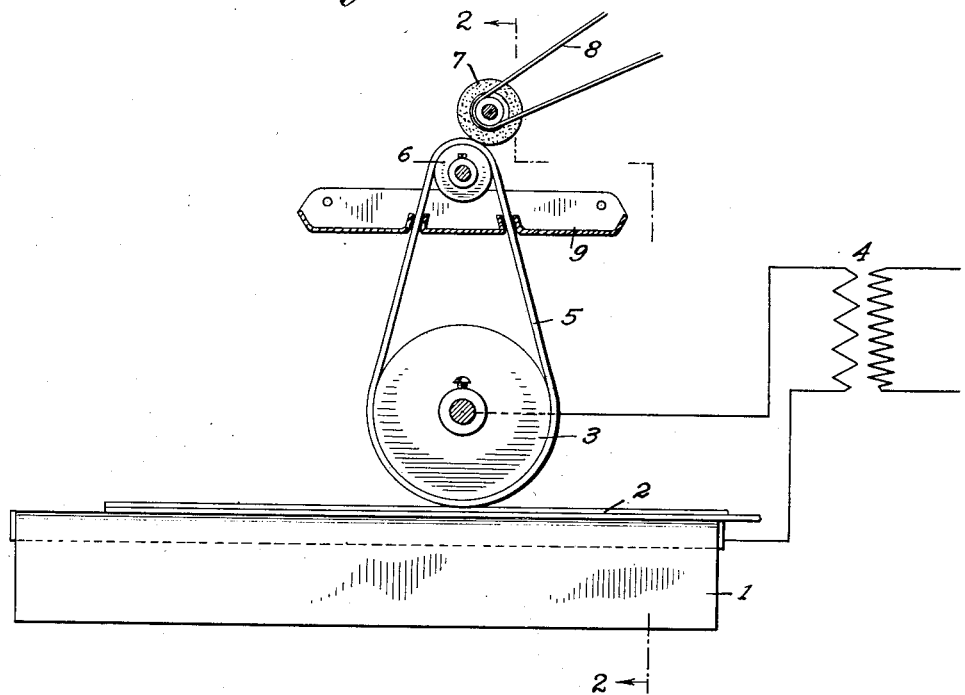

In the accompanying drawings, Figure 1 diagrammatically illustrates the invention in one of its forms.

Figure 2:
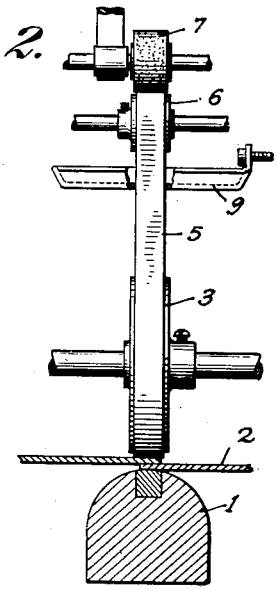

Fig. 2 is an end view of the same.

In the drawings the invention is illustrated as used in making a continuous welded seam and is applicable to any standard type of seam welding apparatus in which a welding roller is employed. Such welding machines and their operation are so well known in the art that illustration of the parts is deemed unnecessary herein.

1 indicates the mandrel or horn upon which the work 2 is supported. 3 indicates the usual roller supported by a carrier (not shown) and by means of which current is supplied to the work 2. The roller and horn are preferably of good conducting material such as copper or bronze and are each connected to an end of the secondary of the transformer 4.

In machines at present in use the roller 3 contacts direct with the work whereas in the present case this contact is made through the intermediary of a thin current conducting band or strip 5 which passes around the periphery of the roller. By preference the band is longer than the periphery of the roller and passes over a guide roll 6 mounted to travel bodily with the roller 3.

In practice the mandrel 1 carrying the work 2 may travel and feed the work progressively past the roller or the mandrel and work may remain stationary and the roller 3, roll 6 and band 5 bodily moved along the seam, the roller 3 rotating and feeding the band 5 progressively to the seam. Again, the work may be fed progressively between a pair of current feeding electrodes. In any case should the band 5 become pitted or mutilated it is readily replaced by a new one giving a clean, smooth work-contacting surface insuring a uniform weld.

If desired, to keep the work-contacting surface of the band 5 clean and smooth, an emery or other suitable wheel 7 may be provided. This wheel may be positively driven by belt 8 or otherwise and acts on the portion of the band previously in engagement with the work to re-dress it or remove slight imperfections, dirt, &c. To prevent such removed particles from falling on the work, pans 9 are provided to collect such removed substances. This is a decided improvement over those constructions wherein the cleaning device acts directly on the welding roller as the particles are removed from the work-contacting surface at a distant point and collected, making it impossible for the same particle to cause trouble a second time.

It will be understood that the invention is not limited to any particular form or construction of apparatus except as may be specified in the appended claims.

What I claim as my invention is:—

1. In an electric seam welding apparatus, the combination of a current supplying roller and a metallic strip engaging a large portion of the periphery of the roller and forming the work-contacting surface thereof.

2. In an electric seam welding apparatus, the combination of a current supplying, roller and a metallic strip engaging the major portion of the periphery of the roller and forming a replaceable contact surface therefor.

3. In an electric welding apparatus, the combination of a current supplying roller and a continuous metallic band engaging the periphery of the roller and forming a detachable work-contacting surface for said roller.

4. In an electric welding apparatus, the combination of a current supplying roller, a guide roll spaced from said roller and a continuous band of conducting material passing around said rolls and forming a work-contacting surface for said current supplying roller.

5. In an electric welding apparatus, the combination of a current supplying roller, a guide roll spaced from said roller, a continuous band of conducting material passing around said rolls and through which current from the roller is supplied to the work and means for re-dressing the previously used work-contacting portions of said band.

6. In an electric welding apparatus, the combination of a current supplying roller, a guide roll spaced from said roller, a continuous band of conducting material connecting said rolls and forming a detachable work-contacting surface for said roller and means acting on said band for redressing the previously used work-contacting surface thereof.

7. In an electric welding apparatus, the combination of a current supplying roller, a guide roll spaced from said roller, a continuous band of conducting material connecting said rolls and forming a detachable work-contacting surface for said roller, means acting on said band to remove imperfections in the previously used surface and means adapted to collect the removed particles.

Signed at New York, in the county of New York, and State of New York, this 6th day of September A. D. 1918.

JAMES H. GRAVELL.

Witnesses:
IRENE LEFKOWITZ,
C. F. TISCHNER.